(No Model.)
J. A. McCLELLAND.
APPARATUS FOR VENEERING OR COVERING ARTICLES WITH PYROXYLINE, &c.
No. 271,495. Patented Jan. 30, 1883.
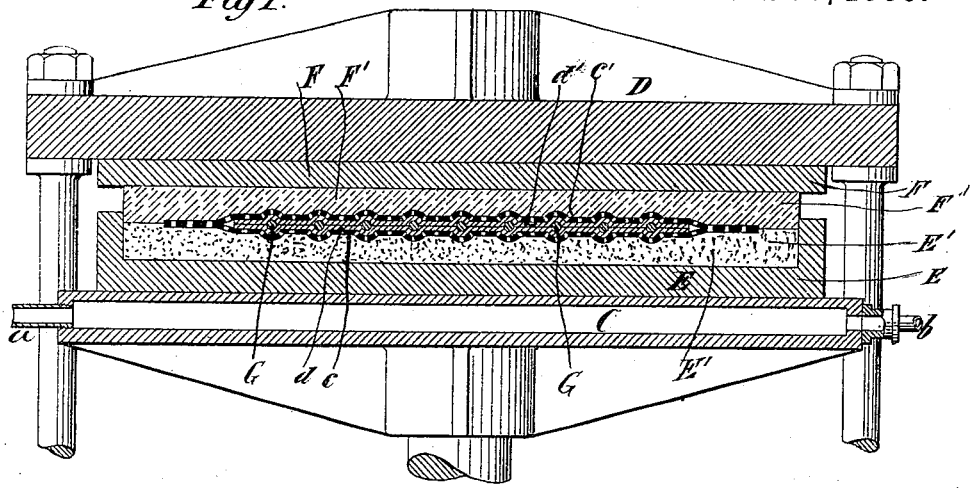
Fig 1.
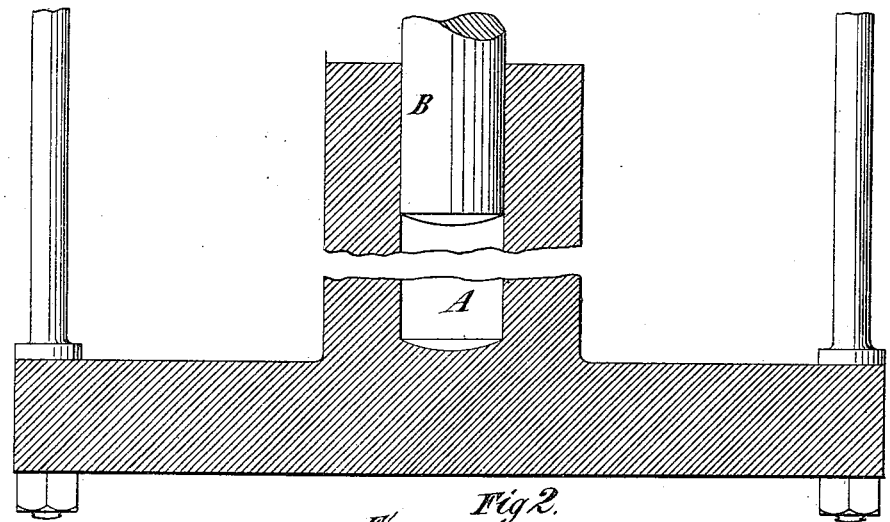
Fig 2.
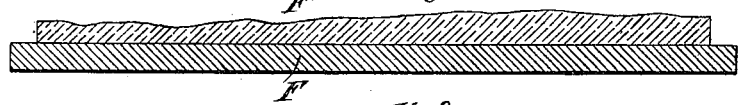
Fig 3.
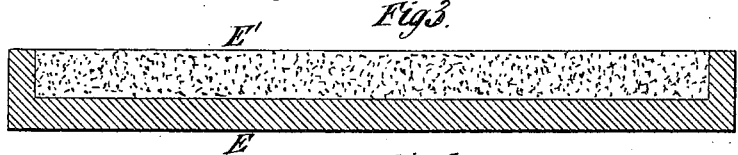
Fig 4.
Witnesses:
Inventor:

UNITED STATES PATENT OFFICE.

JOHN A. McCLELLAND, OF LOUISVILLE, KENTUCKY.

APPARATUS FOR VENEERING OR COVERING ARTICLES WITH PYROXYLINE, &C.

SPECIFICATION forming part of Letters Patent No. 271,495, dated January 30, 1883.

Application filed October 27, 1882. (No model.)

*To all whom it may concern:*

Be it known that I, JOHN A. MCCLELLAND, of Louisville, in the county of Jefferson and State of Kentucky, have invented a new and useful Improvement in Apparatus for Veneering or Covering Articles with Pyroxyline or other Plastic Compound, of which the following is a specification.

My invention is more particularly intended for use in veneering or covering articles on one or all sides with sheets of pyroxyline compound; but it may be employed in so covering articles with india-rubber or other compounds which are used in a plastic state and are hardened by drying or subsequent treatment.

In my application for Letters Patent filed October 5, 1882, and the serial number of which is 73,523, I have described a process of veneering or covering articles with plastic compound which consists in applying a sheet or sheets of plastic material to the article, in inclosing or surrounding the said article and sheet or sheets by mobile or yielding material, and subjecting the mobile or yielding material to pressure to force the plastic material upon every part of the surface of the article which it is desired to cover. For some purposes it is desirable to apply heat to the mobile or yielding material and through it to the plastic compound during the operation of pressing, and where rubber compound is employed the sheet or sheets may be obtained from such compound prepared for vulcanization and vulcanized by heat after being pressed upon the article.

The object of my present invention is to provide for conveniently and effectively applying heat while the mobile or yielding material is under pressure; and to this end the invention consists in the combination of a mold composed of two or more parts containing, faced or lined with mobile or yielding material, and a steam-table, upon which the said mold is supported, and from which heat is imparted to the mobile or yielding material and through it to the article which is being veneered or covered in the mold.

The invention also consists in the combination, with a mold of the kind above described, containing mobile or yielding material, of a platen and head or two equivalent members of a press, whereby pressure may be applied to the mold, and devices providing for heating either of said parts or members of the press.

In the accompany drawings, Figure 1 represents a vertical section of such parts of a hydraulic press as are necessary to illustrate my invention, and a mold contained therein. Fig. 2 represents a sectional view of the upper part of the mold in an inverted position. Fig. 3 represents a sectional view of the under part of the mold; and Fig. 4 represents a sectional view of a steam-table, which constitutes the platen of the press.

Similar letters of reference designate corresponding parts in all the figures.

A designates the cylinder, B the ram, C the platen, and D the head, of a hydraulic press of ordinary form. The platen C is hollow, and is provided with inlet and outlet pipes $a$ $b$ for steam, whereby provision is afforded for heating it, so that it may constitute a steam-table.

The mold or the flask wherein the mobile or yielding material is contained may be of any suitable form or construction. As here represented, it is composed of a box or lower part, E, containing the mobile or yielding material E', and an upper part or board, F, faced with mobile or yielding material F'. When the upper part, F, of the mold is a board or flat plate, as here represented, the mobile or yielding material must be putty or other analogous plastic material, which is spread out on the board or plate when the latter is inverted as shown in Fig. 2. The mobile or yielding material E' in the part E of the mold may be putty, sand, or other substance.

If the upper part of the mold were made of other form, sand or some other material than putty might be used. Where putty is used it should be made with a non-siccative oil, so that it will retain its plastic state. Felt may be employed as a mobile or yielding material, if desired.

The article to be veneered may be a skeleton or core of any form, which is made of the shape desired for the finished article, but somewhat smaller in size. I may apply the sheets of plastic compound to one or both sides thereof.

The article represented in Fig. 1 is a metallic skeleton, G, and is covered on both sides.

In covering the article I first prepare the bed E' of mobile or yielding material, and lay thereon first a sheet of foil, paper, cloth, or other material, c, and then a sheet, d, of plastic compound. I then lay on the article G, and over it place a sheet of plastic compound, d′, and a sheet, c′, of foil, paper, cloth, or other material. The foil, cloth, or paper is used simply to prevent the mobile or yielding material from adhering to the sheets of plastic compound. The upper part, F, of the mold, faced with the mobile or yielding material, is then turned over and placed on the lower part, and the whole mold is placed in the press and subjected to pressure. The pressure is transmitted through the mobile or yielding material to the plastic compound, and the latter is caused to adhere to the skeleton or article and to take the exact form and configuration thereof.

While the mobile or yielding material is under pressure, or before it is subjected to pressure, steam may be caused to circulate through the platen C, and said mobile or yielding material is highly heated and imparts its heat to the plastic compound. The heat will have the effect of hardening or seasoning some plastic materials, and if rubber compound is used the heat may be sufficient to effect the vulcanization of the rubber.

The mobile or yielding material may be of such a nature that it will be very effective in retaining heat—like sand, for instance—and in such case the mobile or yielding material will retain a large part of its heat for several successive operations.

The mobile or yielding material serves as a medium through which both pressure and heat are uniformly imparted to the article being operated upon.

What I claim as my invention, and desire to secure by Letters Patent, is—

1. The combination of a mold composed of two or more parts, containing or faced or lined with mobile or yielding material, and a steam-table on which said mold is supported, substantially as and for the purpose herein described.

2. The combination, with a mold composed of two or more parts, containing or faced or lined with mobile or yielding material, of a platen and head or two members of a press, whereby pressure may be applied to the mold, and devices providing for heating either of said parts of the press, substantially as and for the purpose herein described.

JOHN A. McCLELLAND.

Witnesses:
JOHN ROBERTS,
HENRY WHITESTONE.